(12) United States Patent
Summers et al.

(10) Patent No.: US 11,028,803 B2
(45) Date of Patent: Jun. 8, 2021

(54) RESIN TRANSFER MOLDED ROCKET MOTOR NOZZLE WITH ADAPTIVE GEOMETRY

(71) Applicant: Raytheon Company, Waltham, MA (US)

(72) Inventors: Matt H. Summers, Gilbert, AZ (US); David M. Case, Huntsville, AL (US); John J. Raymond, IV, Tucson, AZ (US); Gray Fowler, McKinney, TX (US); Mark T. Langhenry, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 492 days.

(21) Appl. No.: 16/126,225

(22) Filed: Sep. 10, 2018

(65) Prior Publication Data

US 2020/0080518 A1 Mar. 12, 2020

(51) Int. Cl.
*F02K 9/86* (2006.01)
*F02K 9/97* (2006.01)
*B29C 70/44* (2006.01)

(52) U.S. Cl.
CPC .............. *F02K 9/974* (2013.01); *F02K 9/86* (2013.01); *B29C 70/44* (2013.01)

(58) Field of Classification Search
CPC ... B64G 1/403; F02K 9/08; F02K 9/10; F02K 9/12; F02K 9/14; F02K 9/28; F02K 9/80;
(Continued)

(56) References Cited

U.S. PATENT DOCUMENTS 3,073,111 A 1/1963 Hasbrouck
3,237,402 A 3/1966 Steverding
(Continued)

FOREIGN PATENT DOCUMENTS

JP 5960057 5/1984

OTHER PUBLICATIONS

NASA, Solid Propellant Grain Design and Internal Ballistics, Mar. 1972, Cabot Science Library (Year: 1972).*
(Continued)

*Primary Examiner* — Todd E Manahan
*Assistant Examiner* — Kyle Robert Thomas
(74) *Attorney, Agent, or Firm* — Renner, Otto, Boisselle & Sklar, LLP

(57) ABSTRACT

A rocket motor has a nozzle that is reconfigurable by erosion or ablation of the material around the throat of the nozzle. The nozzle throat has layers of materials with different erosion characteristics, with the erosion occurring so as to achieve the desired nozzle characteristics (configurations) during different parts of the fuel burn. The nozzle throat includes relatively-high-erosion material layers and relatively-low-erosion material layers, with some layers of the throat resisting erosion, while other of the layers erode or ablate relatively quickly. The relatively-low-erosion material layers may act as thermal barriers to fix the throat at relatively stable geometry for long periods of time, such as during most of the burn of different fuel segments, with the relatively-high-erosion material layers allowing rapid transition of the throat from one geometry to the next. The layers may be made by resin transfer molding (RTM).

19 Claims, 5 Drawing Sheets

(58) Field of Classification Search
CPC ... F02K 9/86; F02K 9/97; F02K 9/974; F02K 9/976; F02K 9/978
See application file for complete search history.

(56) References Cited

U.S. PATENT DOCUMENTS

| | | | |
|---|---|---|---|
| 3,447,465 A | | 6/1969 | White |
| 3,776,466 A | | 12/1973 | Ray |
| 4,022,129 A | | 5/1977 | Day et al. |
| 4,272,956 A | | 6/1981 | Lamere |
| 4,384,454 A | * | 5/1983 | Engl ............... F02K 9/974 239/265.15 |
| 4,497,460 A | | 2/1985 | Thorsted et al. |
| 4,844,380 A | | 7/1989 | Peoples et al. |
| 5,320,304 A | | 6/1994 | Danielson |
| 5,359,850 A | * | 11/1994 | Prescott ............... C04B 38/065 60/770 |
| 5,511,745 A | | 4/1996 | Faupell et al. |
| 5,579,635 A | | 12/1996 | Miskelly, Jr. et al. |
| 5,779,151 A | | 7/1998 | Sutton |
| 5,894,723 A | | 4/1999 | Gastal |
| 6,324,833 B1 | | 12/2001 | Singer et al. |
| 6,548,794 B2 | | 4/2003 | Facciano et al. |
| 6,554,936 B1 | | 4/2003 | Metcalf et al. |
| 7,980,057 B2 | | 7/2011 | Facciano et al. |
| 2013/0192215 A1 | | 8/2013 | ørbekk |
| 2015/0204274 A1 | | 7/2015 | Fowler |
| 2016/0341151 A1 | | 11/2016 | McPherson, Sr. |

OTHER PUBLICATIONS

International Search Report and Written Opinion of International Application PCT/US2019/049311 dated Dec. 2, 2019.

\* cited by examiner

RESIN TRANSFER MOLDED ROCKET MOTOR NOZZLE WITH ADAPTIVE GEOMETRY

FIELD OF THE INVENTION

The present invention is related to missiles and rocket motors. More specifically, the present invention relates to rocket motor nozzles.

DESCRIPTION OF THE RELATED ART

A rocket motor uses a convergent-divergent nozzle to accelerate hot combustion gases to produce thrust as described by Newton's third law of motion. The amount of thrust produced by the motor depends on the mass flow rate through the motor, the exit velocity of the flow, and the pressure at the exit of the motor.

The convergent-divergent nozzle has a throat region that is exposed to high temperature and pressure as compared to other zones of the nozzle. Various mechanisms, such as explosives, have been used to change the geometry of the nozzle during operation of the rocket motor, such as during the time between pulses of thrust. However these prior mechanisms have drawbacks.

SUMMARY OF THE INVENTION

A rocket motor nozzle has different layers with different levels of resistance to erosion by combustion products (hot gasses and solid particles) passing through the nozzle.

According to an aspect of the invention, a rocket motor nozzle includes: a pair of relatively-low-erosion material layers; and a relatively-high-erosion material layer sandwiched between the relatively-low-erosion material layers. The relatively-high-erosion material layer is made of a relatively-high-erosion material that erodes more quickly when exposed to flow through the nozzle than does a relatively-low-erosion material or materials of the relatively-low-erosion material layers. This nozzle includes: an inner relatively-low-erosion rate material layer that radially inwardly overlaps the relatively-high-erosion material layer; and an outer relatively-low-erosion rate material layer that radially outwardly overlaps the relatively-high-erosion rate material layer.

According to an embodiment of any paragraph(s) of this summary, the material layers include resin-transfer molded materials.

According to an embodiment of any paragraph(s) of this summary, the relatively-low-erosion material or materials includes fibers.

According to an embodiment of any paragraph(s) of this summary, the relatively-high-erosion material may be fiberless.

According to an embodiment of any paragraph(s) of this summary, the relatively-high-erosion material includes fibers of a different material than the fibers of the relatively-low-erosion material or materials.

According to an embodiment of any paragraph(s) of this summary, the relatively-low-erosion material layers include the same material.

According to an embodiment of any paragraph(s) of this summary, the relatively-high-erosion material layer is an inner relatively-high-erosion material layer.

According to an embodiment of any paragraph(s) of this summary, the nozzle further includes an outer relatively-high-erosion material layer that is radially outward of the inner relatively-high-erosion material layer, and is radially outward of the relatively-low-erosion material layers.

According to an embodiment of any paragraph(s) of this summary, the nozzle is in combination with fuel, as a part of a rocket motor.

According to an embodiment of any paragraph(s) of this summary, the fuel is a solid fuel.

According to an embodiment of any paragraph(s) of this summary, the solid fuel is in multiple segments.

According to an embodiment of any paragraph(s) of this summary, the motor is configured to burn the fuel in multiple pulses.

According to an embodiment of any paragraph(s) of this summary, the nozzle is configured such that during most of a first pulse of the multiple pulses the inner relatively-low-erosion material layer defines a channel of the nozzle through which combustion gasses pass, and such that during most of a second pulse of the multiple pulses the outer relatively-low-erosion material layer defines the channel of the nozzle.

According to another aspect of the invention, a rocket motor includes: a first fuel portion; a second fuel portion; and a nozzle operatively coupled to the fuel portions, with hot gasses produced by burning of the fuel portions passing through the nozzle. The nozzle includes: a pair of relatively-low-erosion material layers; and a relatively-high-erosion material layer sandwiched between the relatively-low-erosion material layers. The relatively-high-erosion material layer is made of a material that erodes more quickly when exposed to flow through the nozzle than does a material or materials of the relatively-low-erosion material layers. The relatively-low-erosion material layers include: an inner relatively-low-erosion material layer that radially inwardly overlaps the relatively-high-erosion material layer; and an outer relatively-low-erosion material layer that radially outwardly overlaps the relatively-high-erosion material layer.

According to an embodiment of any paragraph(s) of this summary, the fuel portions are parts of a single solid fuel segment.

According to an embodiment of any paragraph(s) of this summary, the portions are separate fuel segments, with the first fuel portion being a first fuel segment and the second fuel portion being a second fuel segment.

According to an embodiment of any paragraph(s) of this summary, the first fuel segment and the second fuel segment are configured to be burned sequentially, with the first fuel segment burned before the second fuel segment.

According to an embodiment of any paragraph(s) of this summary, there is no non-fuel-burning time between the burning of the first fuel segment and the burning of the second fuel segment.

According to an embodiment of any paragraph(s) of this summary, the nozzle is configured such that during most of burning of the first fuel portion the inner relatively-low-erosion material layer defines a channel of the nozzle through which combustion gasses pass, and such that most of burning of the second fuel portion of the multiple pulses the outer relatively-low-erosion material layer defines the channel of the nozzle.

According to yet another aspect of the invention, a method of operating a rocket motor includes the steps of: burning a first portion of fuel of the motor, with a nozzle of the motor in a first configuration, with a channel in the nozzle defined by a inner relatively-low-erosion material layer of the nozzle, with the inner relatively-low-erosion material layer eroding during the burning of the first portion; after the burning of at least most of the first portion, and after the inner relatively-low-erosion material layer eroding to expose a relatively-high-erosion material layer that initially underlies the inner relatively-low-erosion material layer, transforming the nozzle from the first configuration to a second configuration by eroding the relatively-high-erosion material layer to expose an outer relatively-low-erosion material layer that initially underlies the relatively-high-erosion material layer; and after the transforming, burning a second portion of the fuel, with the nozzle in the second configuration.

According to an embodiment of any paragraph(s) of this summary, the burning of the second fuel portion follows immediately continuously the burning of the first fuel portion.

According to an embodiment of any paragraph(s) of this summary, the eroding the relatively-high-erosion material layer to expose the outer relatively-low-erosion material layer occurs at least in part during the burning of the first portion.

According to an embodiment of any paragraph(s) of this summary, the eroding the relatively-high-erosion material layer to expose the outer relatively-low-erosion material layer occurs at least in part during the burning of the second portion of the fuel.

According to an embodiment of any paragraph(s) of this summary, the burning of the first portion produces a different thrust than the burning of the second portion of the fuel.

According to a further aspect of the invention, a rocket motor may include: two or more propellant segments; and a nozzle operatively coupled to the propellant segments, with hot gasses produced by burning of the fuel segments passing through the nozzle. For such cases the nozzle could include: alternating relatively-low-erosion material layers and relatively-high-erosion material layers. The relatively-high-erosion material layer may be made of a material that erodes more quickly when exposed to flow through the nozzle than does a material or materials of the relatively-low-erosion material layers.

According to a further aspect of the invention, a rocket motor may include: a delay between fuel segment burns. Alternatively there may be no delay between fuel segment burns, or a combination of some delays and some no-delays between fuel segment burns.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

A rocket motor has a nozzle that is reconfigurable by erosion or ablation of the material around the throat of the nozzle. The nozzle throat has layers of materials with different erosion characteristics, with the erosion occurring so as to achieve the desired nozzle characteristics (configurations) during different parts of the fuel burn. The nozzle throat includes relatively-high-erosion material layers and relatively-low-erosion material layers, with some layers of the throat resisting erosion, while other of the layers erode or ablate relatively quickly. The relatively-low-erosion material layers may act as thermal barriers to fix the throat at relatively stable geometry for long periods of time, such as during most of the burn of different fuel segments, with the relatively-high-erosion material layers allowing rapid transition of the throat from one geometry to the next. The layers may be made by resin transfer molding (RTM), with the composition of the various layers chosen to achieve desired properties and shapes for the nozzle. The nozzle has many advances over previous approaches, including having no moving parts, avoiding the use of explosives, and not having any sudden changes in configuration. Further, the nozzle can be configured over a wide range geometry, to accommodate various burn rates of the rocket motor.

Figure 1:
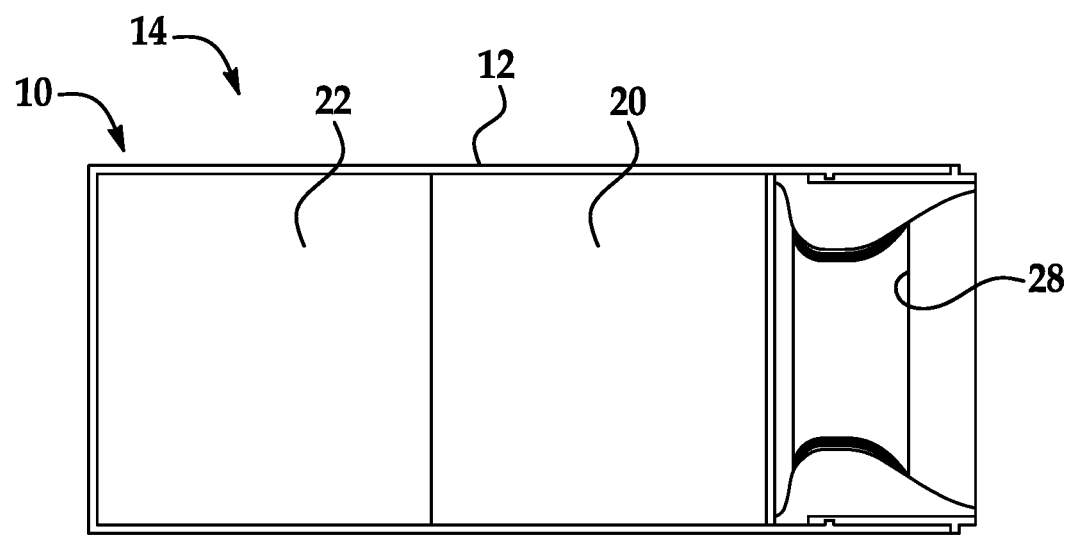
FIG. 1 is a schematic view of a rocket motor according to an embodiment of the invention.

FIG. 1 shows a rocket motor 10 that includes a casing 12, and fuel (or propellant) 14 inside the casing 12. The fuel or propellant 14 may be in multiple fuel segments 20 and 22 that are burned separately. Optionally, an igniter (not shown) may be used for igniting the first fuel segment 20. Pressurized hot gasses produced by the combustion of the fuel segments 20 and 22 pass through a converge-diverge nozzle 28, to produce thrust. The arrangement shown in FIG. 1 is meant to be schematic, with many alternatives possible for the number of fuel samples, and the shape, configuration, and arrangement of components within the casing 12, to give a few example variables.

The fuel segments 20 and 22 may have different burn characteristics, for example with different compositions and/or burn surface geometries that produce different amounts of thrust or pressure as the different segments burn. The segments may burn sequentially, with the first burned segment automatically igniting the second segment, or with combustion in the segments being separately actuated, such as by use of separate igniters. Although the fuel 14 in the illustrated embodiment is in multiple segments, it should be appreciated that the fuel 14 may not necessarily be in separate burnable segments, but may alternatively be burned continuously, in a single burn process. Accordingly the segments 20 and 22 may be considered different fuel portions of a single piece of fuel.

In the following description the fuel 14 is described as a solid fuel. However the nozzle 28 described below may alternatively be used with other sorts of fuel, such as liquid fuel or as part of hybrid rocket motors. Thus the fuel 14 should also be considered to represent other fuel-oxidizer propellant mixtures, either fully liquid or hybrid, for liquid fuel and hybrid rocket motors.

Figure 2:
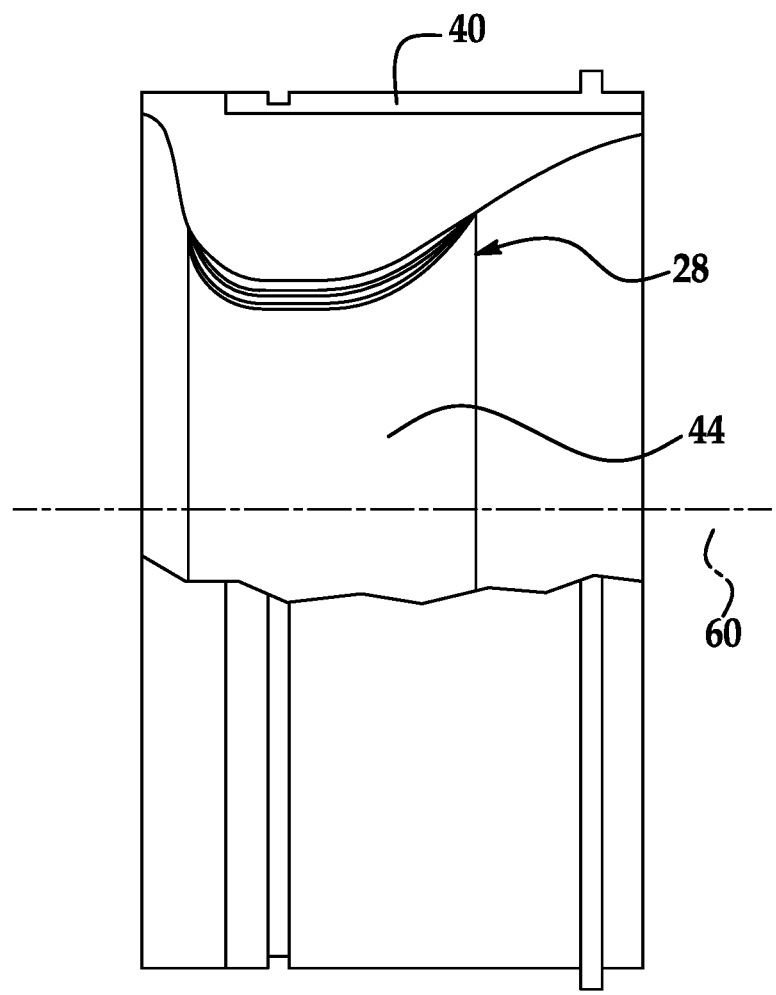
FIG. 2 is a side sectional view showing a more detailed view of the nozzle of the rocket motor of FIG. 1.

FIG. 2 shows the nozzle 28 in greater detail. The casing 12 (FIG. 1) may be made of metal, or another suitable material. There may be a liner 40 on the inside of the casing 12 in the region of the nozzle 28, with the liner 40 being made of a molded resin material or another suitable material. The liner 40 may be regarded as optional, and may be omitted in certain embodiments. The purpose of the liner 40 is to protect the casing 12 from the hot gasses produced by combustion of the fuel 14 (FIG. 1). The material for the liner 40 may be selected to resist erosion or ablation.

The liner 40 may be made as single piece, or may be made in multiple parts, to facilitate its placement about a throat 44 of the rocket motor, a region where the nozzle 28 goes through a minimum area. The nozzle 28 is a multi-layer structure configured to have the layers removed passively by combustion products (hot gasses and solid particles) passing through the nozzle 28. The nozzle 28 is configured to have different shapes for different stages in the combustion of the fuel 14, such as for combustion of different of the fuel segments 20 and 22 (FIG. 1). The nozzle 28 may be integrally formed with one or another part of the liner 40, or may be a separate structure.

Figure 3:
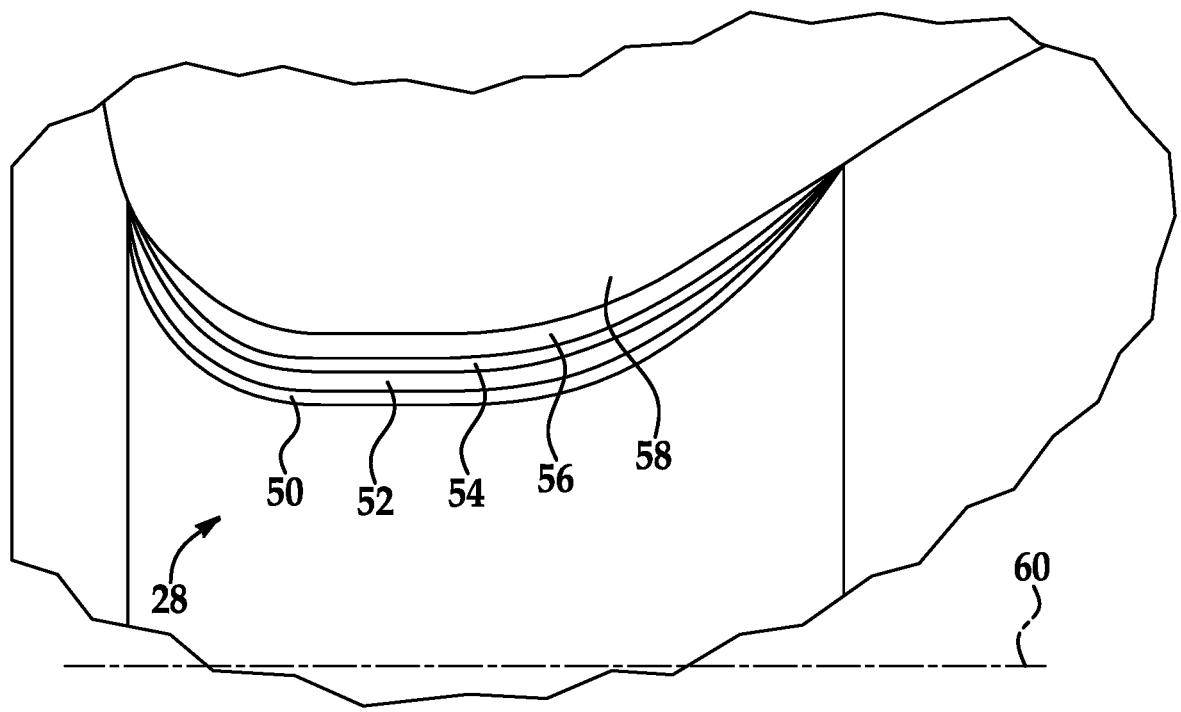
FIG. 3 is a side sectional view showing layers of the nozzle of FIG. 1, with the nozzle in a first (initial) configuration.

FIG. 3 shows one embodiment of the nozzle 28 in greater detail. The nozzle 28 includes layers 50, 52, 54, 56, and 58. The layers alternate between layers of relatively-low-erosion material that provide relatively high resistance to erosion or ablation (the layers 50, 54, and 58), and layers of relatively-high-erosion material that erode relatively quickly when subjected to the flow over them of combustion product hot gasses (the layers 52 and 56). The layers of relatively-high-erosion material 52 and 56 are each sandwiched between outer and inner layers of relatively-low-erosion material 50, 54, and 58. In this application the terms "outer" and "inner" refer to the radial location of the layers in question, with inner layers closer than outer layers to a centerline 60 of the nozzle 28. In general the layers of relatively-high-erosion material 52 and 56 have different material composition and different thicknesses than the layers of relatively-low-erosion material 50, 54, and 58. For instance the layers of relatively-high-erosion material 52 and 56 may be thicker than the layers of relatively-low-erosion material 50, 54, and 58, yet the difference in materials between the different kinds of layers may allow the layers 52 and 56 to erode faster than the layers 50, 54, and 58. For example there may be up to an order of magnitude (or more) of difference in erosion rates, with resin transfer molded (RTM) silica benzoxazine composites having 10% (or about 10%) of the erosion of a chopped fiberglass phenolic. More broadly, relatively-high-erosion materials may include fiberglass or silica based materials, such as RTM composites that include those materials. Relatively-low-erosion materials may include materials with ceramic and/or carbon fibers, for example RTM composites with such fibers.

FIGS. 3-7 illustrate an example of the nozzle 28 in use. While this example is presented in terms burning of discrete fuel segments in discrete burn phases, there could alternatively be a single burn, with different nozzle configurations desired at different times during the burn.

During the burning of the first fuel segment 20, with the nozzle configured as illustrated in FIG. 3, the innermost relatively-low-erosion material layer 50 slowly erodes or ablates, gradually losing thickness. Since this is a slow erosion process, the nozzle 28 maintains the same general configuration during this (relatively long) time period. The nozzle 28 can be configured such that its shape during this time period is optimized to achieve desired performance of the rocket motor 10 (FIG. 1) during the first burn phase, the burning of the fuel segment 20.

Figure 4:
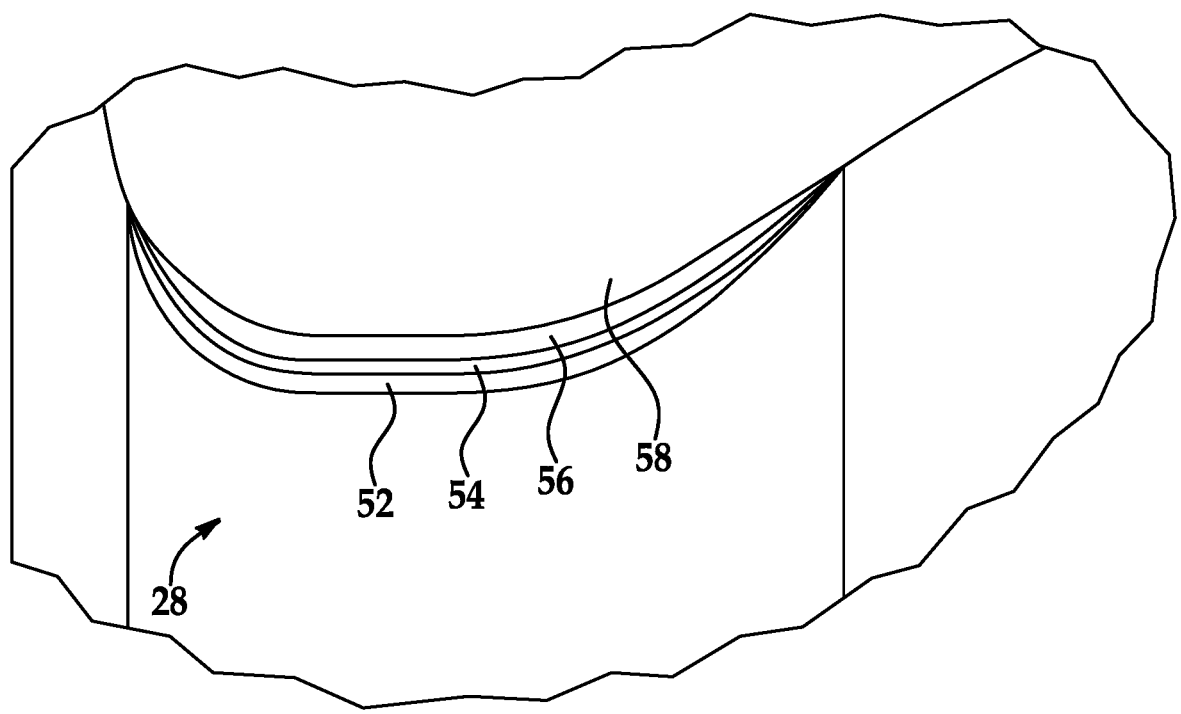
FIG. 4 is a side sectional view showing the nozzle at a second time during operation of the rocket motor.

The layer 50 is configured such that it has eroded away to uncover the underlying relatively-high-erosion material layer 52 at about the same time that the fuel segment 20 is fully burned. At this point the hot combustion gasses quickly erode the layer 52, as shown in FIG. 4, to the produce the situation where the middle relatively-low-erosion material layer 54 defines the shape of the channel that hot combustion products travel through the nozzle, as illustrated in FIG. 5.

Figure 5:
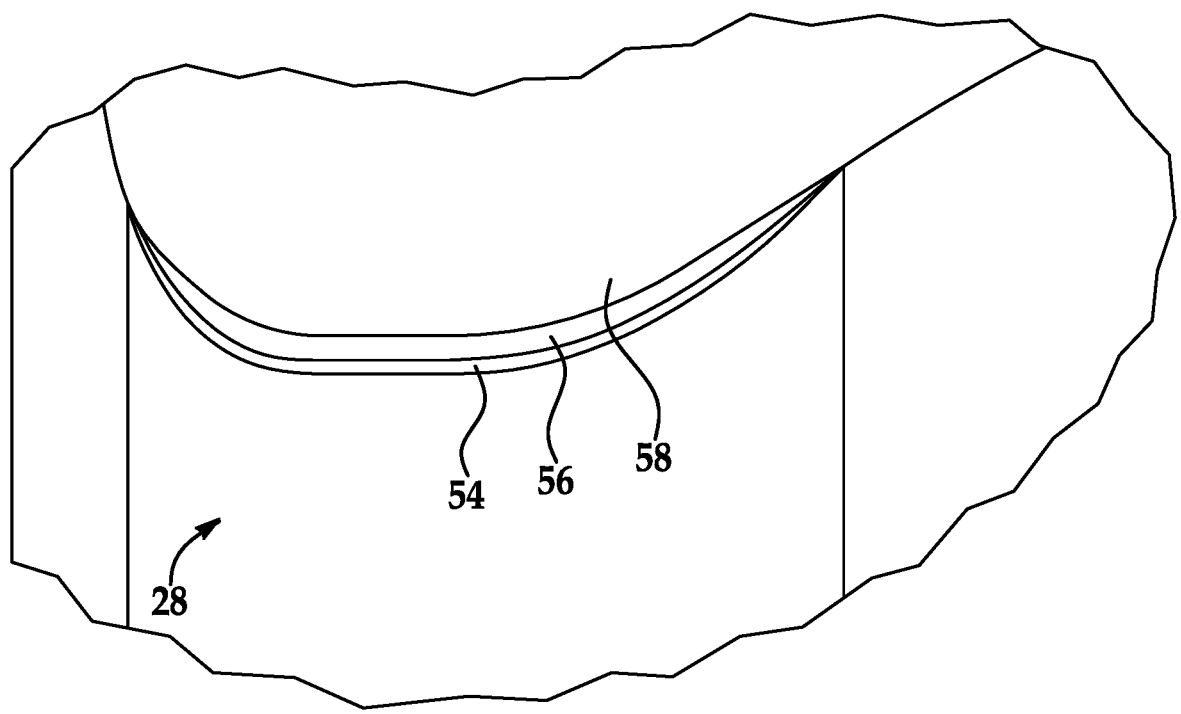
FIG. 5 is a side sectional view showing the nozzle at a third time during operation of the rocket motor.
Figure 6:
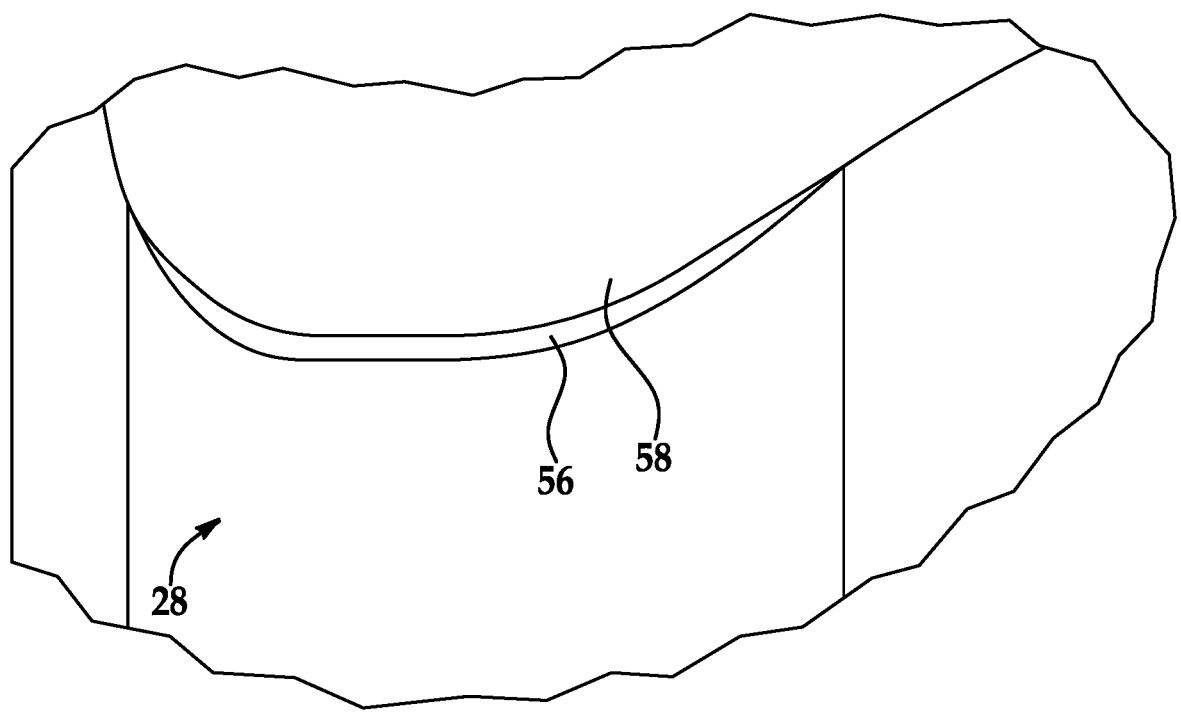
FIG. 6 is a side sectional view showing the nozzle at a fourth time during operation of the rocket motor.
Figure 7:
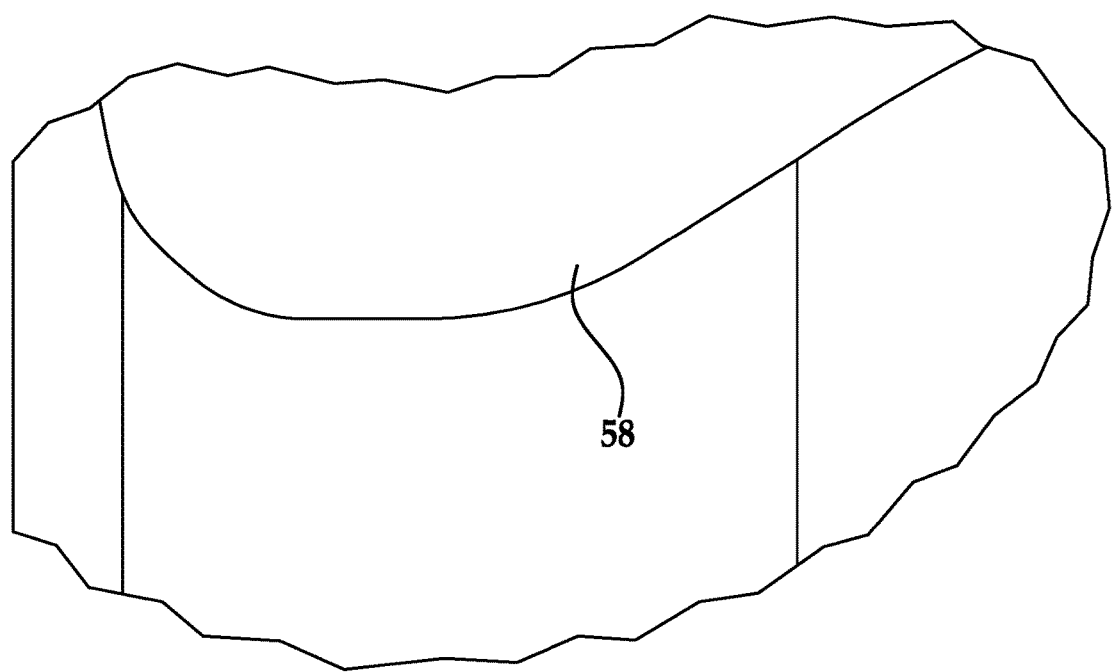
FIG. 7 is a side sectional view showing the nozzle at a fifth time during operation of the rocket motor.

The configuration shown in FIG. 5 may correspond to a shape that is optimized to achieve desired performance of the rocket motor 10 (FIG. 1) during a second burn phase, such as during burning of the fuel segment 22. The hot combustion gases produced by the burning of the second fuel segment 22 slowly erode away the relatively-low-erosion material layer 54. The thickness of the layer 54 may be selected such that the layer 54 is removed just as the second burn phase approached its end, as shown in FIG. 6. At this point the underlying relatively-high-erosion material layer 56 is uncovered, which results in rapid erosion of the layer 56. The full erosion of the layer 56 leaves the outer relatively-low-erosion material layer 58 exposed, as shown in FIG. 7. The layer 58 then defines the (larger) nozzle channel shape for any subsequent fuel burns.

Figure 8:
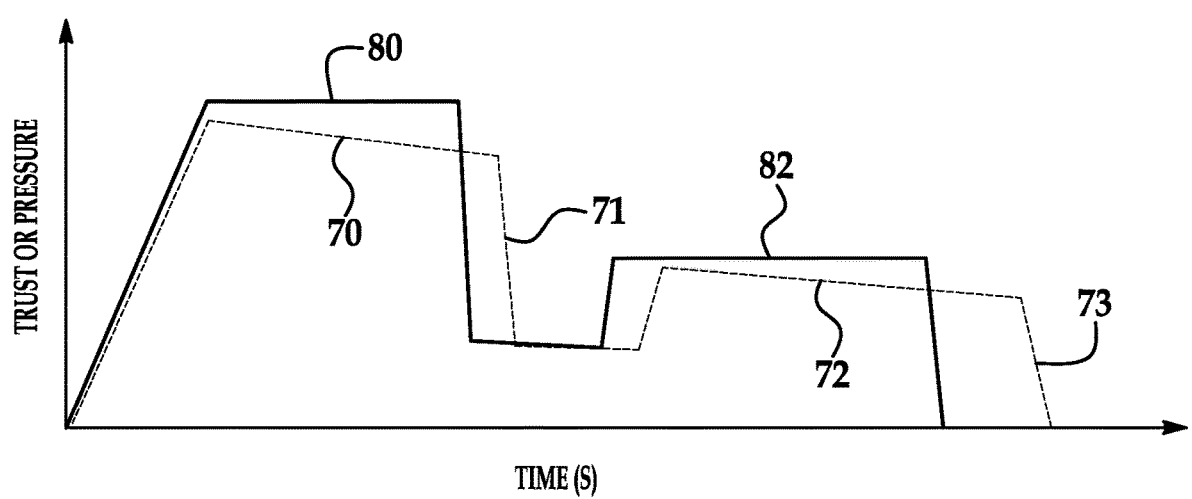
FIG. 8 is graph of thrust versus time qualitatively illustrating operation of a conventional nozzle/motor, and a nozzle/motor of the present invention.

FIG. 8 shows an example comparison between a multi-phase rocket motor of a conventional configuration, and a rocket motor such as the rocket motor 10 (FIG. 1). In a conventional configuration, with the nozzle losing material during the pulses and being reconfigured between pulses, there is some variation (decrease) of the thrust during pulses, indicated at reference numbers 70 and 72, and some variation (increase) of the time during pulses, indicated at reference numbers 71 and 73.

In contrast the rocket motor 10 (FIG. 1) has substantially constant thrust during the pulses, such as indicated at reference numbers 80 and 82. In addition the rocket motor 10 can be configured to continue to burn fuel between the main pulses, with the motor 10 remaining "on." This can be done to remove the relatively-high-erosion material such as in the layers 52 and 56 (FIG. 2). In addition the rocket motor 10 avoids at least some of the dramatic pressure cycling that occurs in operation of a conventional motor.

Figure 9:
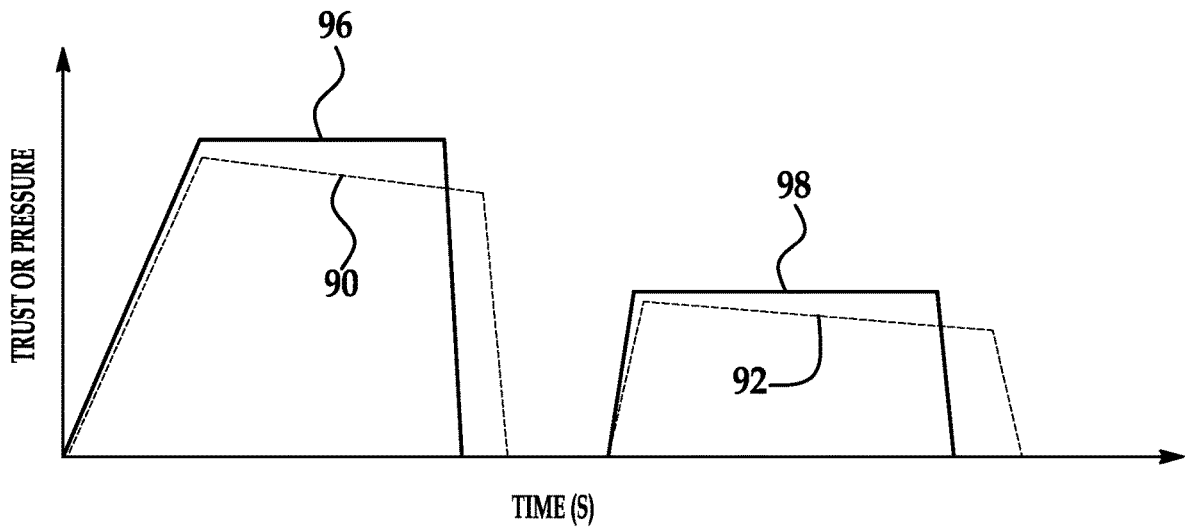
FIG. 9 is another graph of thrust versus time qualitatively illustrating operation of a conventional nozzle/motor, and a nozzle/motor of the present invention, for an embodiment in which thrust is provided in separate, distinct pulses.

Alternatively, as illustrated in FIG. 9, there may be a complete pause between pulses, with substantially no thrust produced in the period(s) between burning of separate fuel parts of segments. The conventional configuration is indicated at reference numbers 90 and 92, with some decrease of thrust during the two pulses. This contrasts with the substantially-constant thrust indicated at reference number 96 and 98, such as may be found in a rocket motor such as the rocket motor 10 (FIG. 1), that uses the nozzle 28 (FIG. 1).

The reconfiguring of the nozzle 28 (FIG. 1) only by erosion/ablation (either fast or slow) avoids problems that can occur when there is a sudden change in nozzle geometry, such as by use of an explosive to separate material of the nozzle in a sudden manner, or by otherwise having sections of the nozzle suddenly separate away. Such rapid change of geometry can produce a steep change in pressure over time, which can lead to unintended extinguishment of the motor. In contrast the gradual, continuous change in nozzle geometry of the rocket motor 10 (FIG. 1) avoids this problem.

Explosives have the disadvantages of adding significant complexity and weight, and of not being native to the rocket motor, and therefore having to be added into the system. Explosives also have the disadvantages of increasing the vibration and shock loads that the rocket motor structure and assembly are subjected to resulting from the operation of the explosives devices. All of these drawbacks are avoided in the rocket motor 10 (FIG. 1).

The layers 50-58 (FIG. 3) may have different materials to produce the different degrees of erosion resistance. One way of varying erosion resistance properties is by use, non-use, or use of different materials for fiber that is placed in the resin. For example fibers may be left out of the relatively-high-erosion material of the layers 52 and 56, while being placed in the relatively-low-erosion material of the layers 50, 54, and 58. Woven fabrics of fine denier yarns or carbon fiber small tows can increase local fiber volume reducing erosion. Large denier and large tows can reduce local fiber volume, increasing resin content, thereby increasing erosion in a localized area. Staggering layers of different types of fibers/fabrics can increase or decrease erosion in local areas. Neat resin can be loaded with fillers/chopped fibers, cured and molded into place to increase/decrease erosion characteristics.

Alternatively different fiber materials may be used in relatively-high-erosion material of layers 52 and 56, versus those used in the relatively-low-erosion material layers 50, 54, and 58. Different resins may also be used in different of the layers 50-58 to achieve different erosion characteristics. For example layer thickness may be a function for erosion rate and the desired burn time at the specific thrust level for that material.

The description above has been made with regard to a circular cross-sectional nozzle. It will be appreciated that the principles described herein may be applied to nozzles with other cross-sectional shapes.

Figure 10:
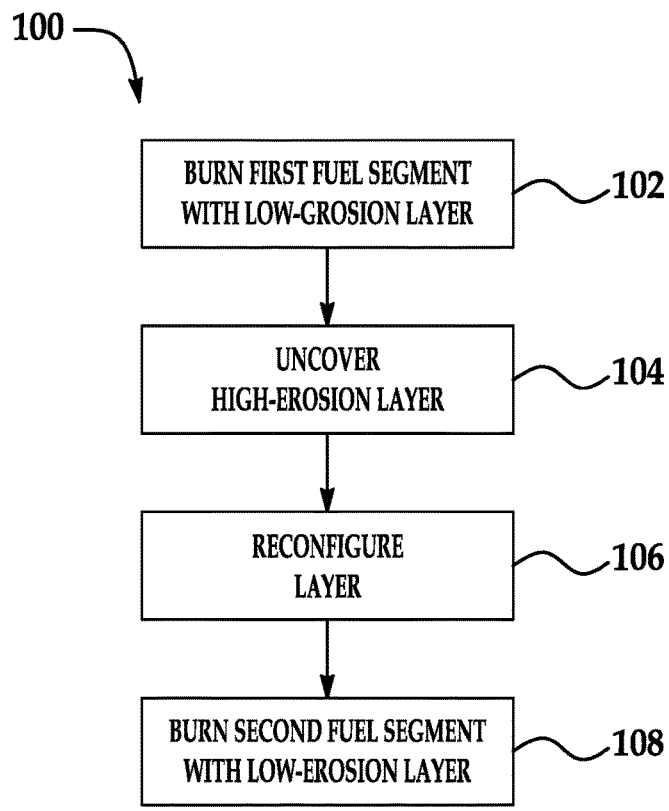
FIG. 10 is a high-level flow chart showing a method of operating a rocket motor, according to an embodiment of the present invention.

FIG. 10 shows a high-level flow chart of a method 100 of operating a rocket motor, such as the motor 10 (FIG. 1). The method 100 includes in step 102 burning a first segment of fuel of the motor, with a nozzle of the motor in a first configuration, with a channel in the nozzle defined by an inner relatively-low-erosion material layer of the nozzle, with the inner relatively-low-erosion material layer eroding during the burning of the first segment.

After the burning of at least most of the first fuel segment in step 102, and after the inner relatively-low-erosion material layer eroding to expose a relatively-high-erosion material layer that initially underlies the inner relatively-low-erosion material layer in step 104, in step 106 there is a transforming of the nozzle from the first configuration to a second configuration. This is accomplished by eroding the relatively-high-erosion material layer to expose an outer relatively-low-erosion material layer that initially underlies the relatively-high-erosion material layer.

After the transforming in step 106, in step 108 there is a burning a second segment of the fuel, with the nozzle in the second configuration. The second burning may involve less thrust than in the burning of the first segment. Note that eroding of the relatively-high-erosion material layer in step 104 may occur during the first segment burning (step 102), during the second fuel segment (step 108), or overlapping both of the burning steps (occurring at the end of the first segment burning and the beginning of the second segment burning).

Many variations on this basic method are possible. For example there may be more fuel segments and more layers of the nozzle. Other variations in the timing of the various steps are possible.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rocket motor nozzle comprising:
   a pair of relatively-low-erosion material layers; and
   a relatively-high-erosion material layer sandwiched between the relatively-low-erosion material layers;
   wherein each of the pair of relatively-low-erosion material layers and the relatively-high-erosion material layer include resin-transfer molded materials;
   wherein the resin transfer molded material of the pair of relatively-low-erosion material layers and the resin transfer molded material of the relatively-high-erosion material layer are different materials;
   wherein the relatively-high-erosion material layer k made of a relatively-high-erosion material that erodes more quickly when exposed to flow through the nozzle than does a relatively-low-erosion material or materials of the relatively-low-erosion material layers; and
   wherein the relatively-low-erosion material layers include:
      an inner relatively-low-erosion material layer that radially inwardly overlaps the relatively-high-erosion material layer; and
      an outer relatively-low-erosion material layer that radially outwardly overlaps the relatively-high-erosion material layer.

2. The rocket motor nozzle of claim 1,
   wherein the relatively-low-erosion material or materials includes fibers; and
   wherein the relatively-high-erosion material is fiberless.

3. The rocket motor nozzle of claim 1,
wherein the relatively-low-erosion material or materials includes fibers; and
wherein the relatively-high-erosion material includes fibers of a different material than the fibers of the relatively-low-erosion material or materials.

4. The rocket motor nozzle of claim 1, wherein the relatively-low-erosion material layers include the same material.

5. The rocket motor nozzle of claim 1,
wherein the relatively-high-erosion material layer is an inner relatively-high-erosion material layer; and
further comprising an outer relatively-high-erosion material layer that is radially outward of the inner relatively-high-erosion material layer, and is radially outward of the relatively-low-erosion material layers.

6. The rocket motor nozzle of claim 1, in combination with fuel, as a part of a rocket motor.

7. The combination of claim 6, wherein the fuel is a solid fuel.

8. The combination of claim 7, wherein the solid fuel is in multiple segments.

9. The combination of claim 6,
wherein the motor is configured to burn the fuel in multiple pulses; and
wherein the nozzle is configured such that during most of a first pulse of the multiple pulses the inner relatively-low-erosion material layer defines a channel of the nozzle through which combustion gasses pass, and such that during most of a second pulse of the multiple pulses the outer relatively-low-erosion material layer defines the channel of the nozzle.

10. A rocket motor comprising:
a first fuel portion;
a second fuel portion; and
a nozzle operatively coupled to the fuel portions, with hot gasses produced by burning of the fuel portions passing through the nozzle;
wherein the nozzle includes:
a pair of relatively-low-erosion material layers; and
a relatively-high-erosion material layer sandwiched between the relatively-low-erosion material layers;
wherein each of the pair of relatively-low-erosion material layers and the relatively-high-erosion material layer include resin-transfer molded materials;
wherein the resin transfer molded material of the pair of relatively-low-erosion material layers and the resin transfer molded material of the relatively-high-erosion material layer are different materials;
wherein the relatively-high-erosion material layer is made of a material that erodes more quickly when exposed to flow through the nozzle than does a material or materials of the relatively-low-erosion material layers; and
wherein the relatively-low-erosion material layers include:
an inner relatively-low-erosion material layer that radially inwardly overlaps the relatively-high-erosion material layer; and
an outer relatively-low-erosion material layer that radially outwardly overlaps the relatively-high-erosion material layer.

11. The rocket motor of claim 10, wherein the fuel portions are parts of a single solid fuel segment.

12. The rocket motor of claim 10,
wherein the portions are separate fuel segments, with the first fuel portion being a first fuel segment and the second fuel portion being a second fuel segment; and
wherein the first fuel segment and the second fuel segment are configured to be burned sequentially, with the first fuel segment burned before the second fuel segment.

13. The rocket motor of claim 12, wherein there is no non-fuel-burning time between the burning of the first fuel segment and the burning of the second fuel segment.

14. The rocket motor of claim 10, wherein the nozzle is configured such that during most of burning of the first fuel portion the inner relatively-low-erosion material layer defines a channel of the nozzle through which combustion gasses pass, and such that most of burning of the second fuel portion of the multiple pulses the outer relatively-low-erosion material layer defines the channel of the nozzle.

15. A method of operating a rocket motor, the method comprising:
burning a first portion of fuel of the motor, with a nozzle of the motor in a first configuration, with a channel in the nozzle defined by an inner relatively-low-erosion material layer of the nozzle, with the inner relatively-low-erosion material layer eroding during the burning of the first portion;
after the burning of at least most of the first portion, and after the inner relatively-low-erosion material layer eroding to expose a relatively-high-erosion material layer that initially underlies the inner relatively-low-erosion material layer, transforming the nozzle from the first configuration to a second configuration by eroding the relatively-high-erosion material layer to expose an outer relatively-low-erosion material layer that initially underlies the relatively-high-erosion material layer; and
after the transforming, burning a second portion of the fuel, with the nozzle in the second configuration;
wherein each of the inner relatively-low-erosion material layer, the relatively-high-erosion material layer and the outer relatively-low-erosion material layer include resin-transfer molded materials;
wherein the resin transfer molded material of the pair of relatively-low-erosion material layers and the resin transfer molded material of the relatively-high-erosion material layer are different materials.

16. The method of claim 15, wherein the burning of the second fuel portion follows immediately continuously the burning of the first fuel portion.

17. The method of claim 15, wherein the eroding the relatively-high-erosion material layer to expose the outer relatively-low-erosion material layer occurs at least in part during the burning of the first portion.

18. The method of claim 15, wherein the eroding the relatively-high-erosion material layer to expose the outer relatively-low-erosion material layer occurs at least in part during the burning of the second portion.

19. The method of claim 15, wherein the burning of the first portion produces a different thrust than the burning of the second portion.

* * * * *